United States Patent
Freking et al.

(10) Patent No.: US 9,043,526 B2
(45) Date of Patent: May 26, 2015

(54) VERSATILE LANE CONFIGURATION USING A PCIE PIE-8 INTERFACE

(75) Inventors: Ronald E. Freking, Rochester, MN (US); Elizabeth A. McGlone, Rochester, MN (US); Daniel R. Spach, Pittsboro, NC (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/528,146

(22) Filed: Jun. 20, 2012

(65) Prior Publication Data

US 2013/0346665 A1 Dec. 26, 2013

(51) Int. Cl.
*G06F 13/40* (2006.01)

(52) U.S. Cl.
CPC .................................. *G06F 13/4018* (2013.01)

(58) Field of Classification Search
CPC .................................................... G06F 13/4018
USPC .................................. 710/106, 307, 310, 313
See application file for complete search history.

(56) References Cited

U.S. PATENT DOCUMENTS

| | | | |
|---|---|---|---|
| 7,136,953 B1 * | 11/2006 | Bisson et al. ................. | 710/307 |
| 7,571,271 B2 * | 8/2009 | Goma et al. .................. | 710/310 |
| 7,640,383 B2 * | 12/2009 | Tseng .......................... | 710/104 |
| 7,702,840 B1 | 4/2010 | McCarthy et al. | |
| 7,788,439 B1 * | 8/2010 | Tsu et al. ...................... | 710/307 |
| 7,844,767 B2 * | 11/2010 | Cherukuri et al. ............ | 710/106 |
| 7,930,462 B2 | 4/2011 | Wang et al. | |
| 7,996,591 B2 * | 8/2011 | Xie et al. ....................... | 710/104 |
| 8,103,993 B2 * | 1/2012 | Atherton et al. .............. | 716/100 |
| 8,621,247 B2 * | 12/2013 | Kendall et al. ............... | 713/300 |
| 2006/0112210 A1 | 5/2006 | Tseng | |
| 2007/0011534 A1 * | 1/2007 | Boudon et al. ............... | 714/732 |
| 2009/0006708 A1 | 1/2009 | Lim | |
| 2009/0041099 A1 * | 2/2009 | Das Sharma et al. ........ | 375/220 |
| 2009/0323722 A1 * | 12/2009 | Sharma ......................... | 370/470 |
| 2010/0284451 A1 * | 11/2010 | Murari .......................... | 375/220 |
| 2011/0116807 A1 * | 5/2011 | Park et al. ..................... | 398/164 |

\* cited by examiner

*Primary Examiner* — Paul R Myers
(74) *Attorney, Agent, or Firm* — Patterson & Sheridan, LLP

(57) ABSTRACT

Each PCIe device may include a media access control (MAC) interface and a physical (PHY) interface that support a plurality of different lane configurations. These interfaces may include hardware modules that support 1×32, 2×16, 4×8, 8×4, 16×2, and 32×1 communication. Instead of physically connecting each of the hardware modules in the MAC interface to respective hardware modules in the PHY interface using dedicated traces, the device may include two bus controllers that arbitrate which hardware modules are connected to a internal bus coupling the two interfaces. When a different lane configuration is desired, the bus controller couples the corresponding hardware module to the internal bus. In this manner, the different lane configurations share the same lanes (and wires) of the bus as the other lane configurations. Accordingly, the shared bus only needs to include enough lanes (and wires) necessary to accommodate the widest lane configuration.

12 Claims, 9 Drawing Sheets

VERSATILE LANE CONFIGURATION USING A PCIE PIE-8 INTERFACE

BACKGROUND

The field of the invention is generally related to Peripheral Components Interconnect (PCI), and more specifically, to reducing the number of traces required for connecting multiple physical interfaces.

A PCI Express bus is an implementation of the Peripheral Components Interconnect (PCI) computer bus according to the set of PCI Express specifications promulgated by the PCI Special Interest Group (PCI SIG). A PCI Express bus uses existing PCI programming and software concepts, but is based on a different and much faster serial physical-layer communications protocol. Specifically, PCI Express is a network of serial interconnections extending to multiple devices in a PCI Express hierarchy which may contain PCI Express switches. The switches provide point-to-point communications between devices connected to each switch. Devices and switches operating according to the PCI Express specifications are generally referred to as 'PCI Express devices' and 'PCI Express switches' respectively.

A connection between any two PCI Express devices is referred to as a 'link.' A link consists of a collection of one or more lanes used for data communications between devices. Each lane is a set of two unidirectional low voltage differential signaling pairs of transmission pathways such as, for example, traces along a motherboard. Because transmitting data and receiving data are implemented using separate differential pairs, each lane allows for full-duplex serial data communication of up to five gigabits of data per second.

All devices at least support single-lane links. PCI Express devices may optionally support wider links composed of two, four, eight, twelve, sixteen, or thirty-two lanes by providing additional pins on the hardware interface of the device that plug into a PCI Express connector. A PCI Express connector is a connector manufactured according to the PCI Express specifications and may physically support connections for one, two, four, eight, twelve, sixteen, or thirty-two lanes in a manner similar to PCI Express devices. A PCI Express device may install into any PCI Express connector that physically supports the same or a greater number of lanes as the lanes physically supported by the PCI Express device. For example, a PCI Express device physically supporting eight lanes may be installed in to a PCI Express connector physically supporting eight, twelve, sixteen, or thirty-two lanes. Such an eight lane PCI Express device, however, cannot be physically installed in a one, two, or four lane PCI Express connector.

Although a PCI Express device and the PCI Express connector into which the device is installed may physically support links with up to thirty-two lanes, a PCI Express device may utilize fewer lanes for data communication than the maximum number of lanes physically supported by the device and the connector. For example, a PCI Express device may physically support eight lanes and be installed in a PCI Express connector physically supporting sixteen lanes. The eight lane PCI Express device may, however, only utilize one, two, or four of those eight lanes it supports for data communications with other PCI Express devices. The number of lanes actually utilized for the data communications link between two devices is typically the highest number of lanes mutually supported by the devices.

SUMMARY

One embodiment disclosed herein provides a method that transfers data on an internal bus in a computing device based on a first lane configuration where the internal bus transfers data in parallel between two circuit modules of a peripheral component interconnect type connection using a plurality of lanes. The method includes receiving a request to change from a first lane configuration to a second lane configuration and responsive to the request, transferring data between the two circuit modules on the internal bus using the second lane configuration. The second lane configuration uses at least one of the lanes of the internal bus that was used to transfer data based on the first lane configuration.

Another embodiment disclosed herein provides a computing device including a first interface that includes hardware modules configured to support at least a first lane configuration and a second lane configuration for transmitting data in a PCI type connection and a second interface that includes hardware modules configured to support at least the first lane configuration and the second lane configuration. The computing device including an internal bus comprising a plurality of lanes for transmitting data between the first and second interfaces and at least two bus controllers configured to selectively provide access between the hardware modules of the first and second interfaces and the internal bus. The hardware modules of the first and second interfaces use at least one of the plurality of lanes when transmitting data in the first lane configuration that is also used when transmitting data in the second lane configuration and the first and second lane configurations are allocated at least one lane of the internal bus to create at least one PCI type link.

Another embodiment disclosed herein provides a system that includes an external bus for serial communication and a first computing device including a first interface that includes hardware modules configured to support at least a first lane configuration and a second lane configuration for transmitting data in a PCI type connection and a second interface that includes hardware modules configured to support at least the first lane configuration and the second lane configuration. The first computing device including an internal bus comprising a plurality of lanes for transmitting data between the first and second interfaces and at least two bus controllers configured to selectively provide access between the hardware modules of the first and second interfaces and the internal bus. The hardware modules of the first and second interfaces use at least one of the plurality of lanes when transmitting data in the first lane configuration that is also used when transmitting data in the second lane configuration and the first and second lane configurations are allocated at least one lane of the internal bus to create at least one PCI type link. The system including a second computing device where the external bus couples to both the first and second computing devices and transfers data serially between the first and second computing devices.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
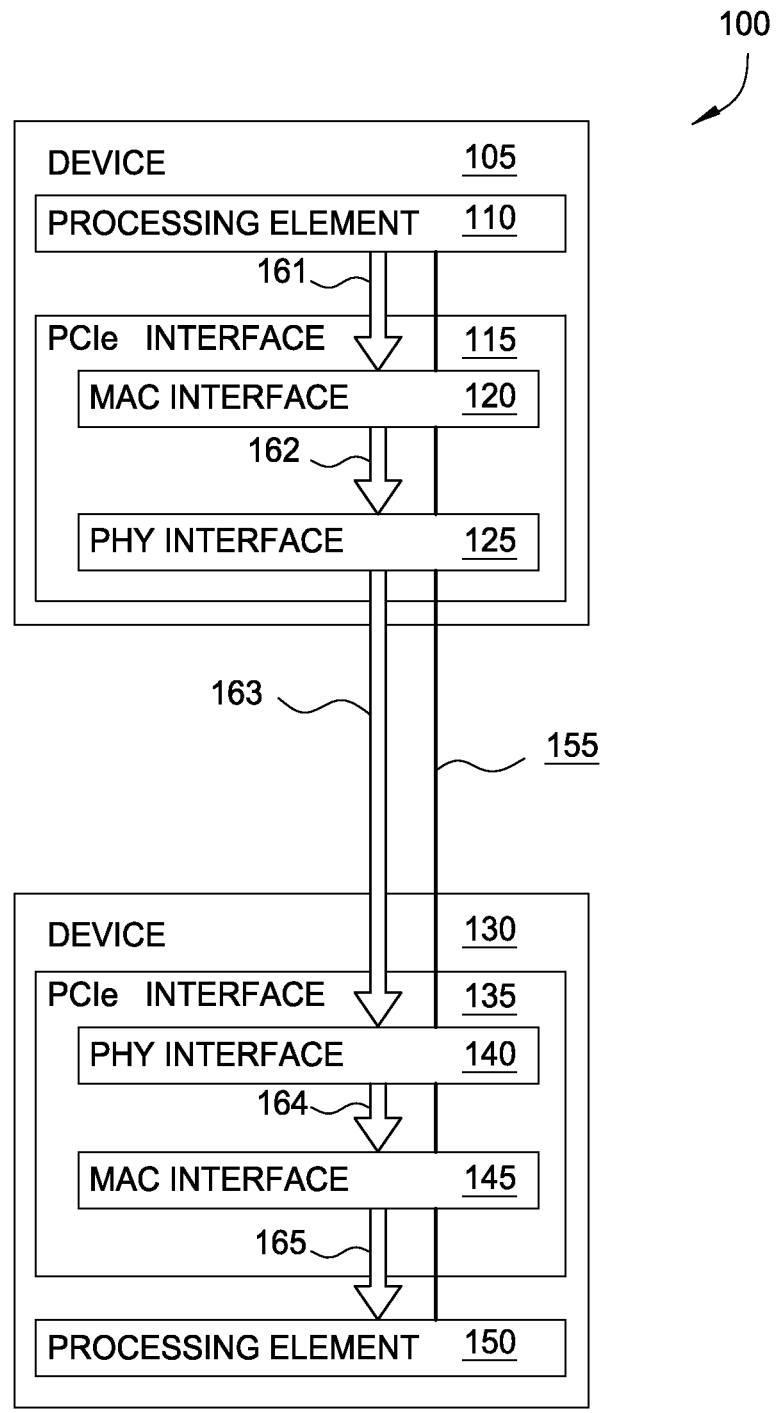
FIG. 1 illustrates a system communicating serial data, according to an embodiment disclosed herein.

Computing devices may be connected using serial communication techniques such as the Peripheral Components Interconnect (PCI) specification—e.g., conventional PCI, PCI Express (PCIe), or PCI-X standards. Although the embodiments discussed below refer specifically to PCIe, the embodiments may equally apply to the other PCI standards or lane-based communication methods.

PCIe devices may be configured to operate in a plurality of different PCIe link widths (i.e., ×1, ×2, ×4, ×8, ×16, ×32, etc.) by transmitting data serially along the different lanes. As mentioned above, a lane that supports full-duplex serial data communication includes two differential pairs (four wires) which permit bi-directional communication between the PCIe devices. For example, the PCIe devices may communicate using a PCIe link with a width of ×16 lanes. Moreover, the PCIe devices may use a plurality PCIe links for serial communication. That is, the devices may communicate serially using, for example, two PCIe links that are both 8 lanes wide (i.e., a 2×8 lane configuration) or four PCIe links that are each 4 lanes wide (i.e., a 4×4 lane configuration). Each PCIe link may be assigned to a respective application associated with a PCIe device. The application uses the lane configuration to transmit data to other applications associated with a different PCIe device. In this manner, a bus—i.e., the physical interconnect with a plurality of traces connecting the PCIe devices—may be allocated to support a plurality of PCIe links with different widths. As used herein, a "lane configuration" defines how the lanes of the bus or a PCIe connection are allocated to establish the one or more PCIe links between the devices as well the width of each of these links. For example, a 2×8 lane configuration corresponds to the lanes of the bus or PCIe connection being divided into two PCIe links that are each eight lanes wide.

Each PCIe device may include a physical (PHY) interface and a media access control (MAC) interface that each supports a plurality of different of lane configurations. For example, each device may have PHY and MAC interfaces with respective hardware modules that support 1×32, 2×16, 4×8, 8×4, 16×2, and 32×1 lane configurations. The PHY and MAC interfaces are coupled by a bus or a plurality of interconnects that is disposed on the PCIe device. The interface between the PHY and MAC interfaces is also referred to as the PIPE or the PIE-8 interface (i.e., PHY Interface Extensions that supports 8 GT/s PCIe). Instead of configuring the internal bus such that each of the hardware modules in the MAC interface is physically connected to respective hardware modules in the PHY interface using dedicated traces, the PHY and MAC interfaces may include a bus controller that arbitrates which hardware modules are connected to the internal bus between the interfaces. As used herein, "internal bus" means the traces are routed in a chip or in a substrate on which the chip is disposed. Accordingly, the internal bus, which is shared by all the hardware modules, only needs to include enough lanes (and wires) necessary to accommodate the lane configuration with the greatest number of lanes. In the example provided above, the lane configurations use a total of 32 lanes. Thus, the internal bus need only include enough physical traces to accommodate these 32 lanes.

In contrast, if each of the hardware modules in the PHY and MAC interfaces were individually connected, the bus between the interfaces would need enough traces to support 192 lanes (6×32). However, the PCIe device may be configured to use only one of the lane configurations (e.g., 4×8) at any one time. In this case, the other lanes of the bus are unused—e.g., 32 lanes are used while the other 160 lanes are unused. Thus, permitting the different hardware modules to access the same lanes on the internal bus by using a bus controller minimizes wire congestion by reducing the number of traces in the internal bus in the PCIe device. Because the PCIe device may be configured to use only one lane configuration at any one time for transferring data between the PHY and MAC interfaces, sharing the same lanes on the bus may not significantly hinder performance relative to a bus that provides separate connections between each of the hardware modules in the PHY and MAC interfaces.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system communicating serial data, according to an embodiment disclosed herein. As shown, computing device 105 and computing device 130 communication using a PCIe connection 163. Although data is shown as traveling from device 105 to device 130, bidirectional traffic is also possible; for example, the PCIe bus 155 may include one or more lanes of two unidirectional low voltage differential signaling pairs that permit serial data traffic to be transferred in both directions (i.e., from device 105 to device 130 and from device 130 to device 105) during the same clock cycle. Moreover, the system 100 may be implemented using other types of serial communication method, and thus, the embodiments disclosed herein are not limited to PCIe serial communication.

Device 105 and 130 include respective processing elements 110 and 150 which may represent one or more processors (e.g., microprocessors) or multi-core processors. The devices 105, 110 also include PCIe interfaces 115 and 135 that convert data received from the processing elements 110, 150 into PCIe packets which are then transmitted across the bus 155. Additionally, the PCIe interfaces 115, 135 receive PCIe packets which are then converted and transmitted to the respective processing elements 110, 150. Although not shown, the devices 105 and 130 may include applications in memory that use the processing elements 110, 150 and PCIe interfaces 115, 135 to transmit and receive data via the bus 155. For example, device 105 may be the chipset for a computing device while device 130 may be a graphics card. Graphics applications executing in the graphics card receive display information from a display driver application executing in the chipset, process the display information, and transmit updated display information back to the display driver application using the PCIe connection 163.

The PCIe interfaces 115 and 135 include MAC interfaces 120 and 145 and PHY interfaces 125 and 140. The MAC interfaces 120, 145 receive data from and transmit data to the processing elements 110 and 150. In one embodiment, the MAC interfaces 120, 145 and processing elements 110, 150 transfer data in parallel rather than serially. That is, paths 161 and 165 may be an internal data bus that transmits synchronized, related data across a plurality of traces on each clock cycle rather than a plurality of traces that may each send one bit that may be unrelated to the bits being sent on the other traces. The MAC interfaces 120 (also referred to as a PCIe stack) may be further subdivided (not shown) into a plurality of levels such as a data level, link-to-link level, PCIe packet processing level, packet conversion levels, etc. Generally, these levels convert the information received from applications in one format into PCIe packets that are compatible with the PCI specification (and vice versa).

The PCIe packets generated in the MAC interfaces 120, 145 are transmitted to the PHY interfaces 125, 140 where the PCIe packets are serialized (via a SERDES) and transmitted on the bus 155 using the designated lane configuration (e.g., 1×32, 2×16, 4×8, etc.). Although, the connection between the MAC interface and PHY interface may transmit data in parallel, the PHY interfaces 125, 140 transmit data serially across the bus 155. In one embodiment, the PCIe interface may include a control module that transmits configuration logic between the different interfaces in the devices 105, 130 that determines which lane configuration the PHY interfaces 140 use to transmit the PCIe packets. In one embodiment, the MAC interfaces 120 and 145 and PHY interfaces 125 and 140 are compatible with the PIE-8 standard for Generation 3 PCIe.

In the embodiment shown in FIG. 1, the processing element 110 on device 105 receives data intended for an application executing on device 130. As shown by data path 161, this data is transmitted to the PCIe interface 115 where the MAC interface 120 converts the data from a format used by the processing element 110 and the application into a PCIe packet. Data path 162 illustrates transmitting the PCI packets to the PHY interface 125 where the packets are transmitted serially along bus 155 using the designated lane configuration. Once the serial data reaches device 130 (i.e., via data path 163) the PHY interface 140 collects the PCIe packets and transmits the packets via data path 164 to the MAC interface 145. As mentioned above, the packets may be transmitted in parallel in data path 165 rather than serially. The MAC interface 145 reconverts the PCIe packets into a format compatible with processing element 150 which processes the data according to instructions issued by one or more applications executing on the device 130.

Figure 2:
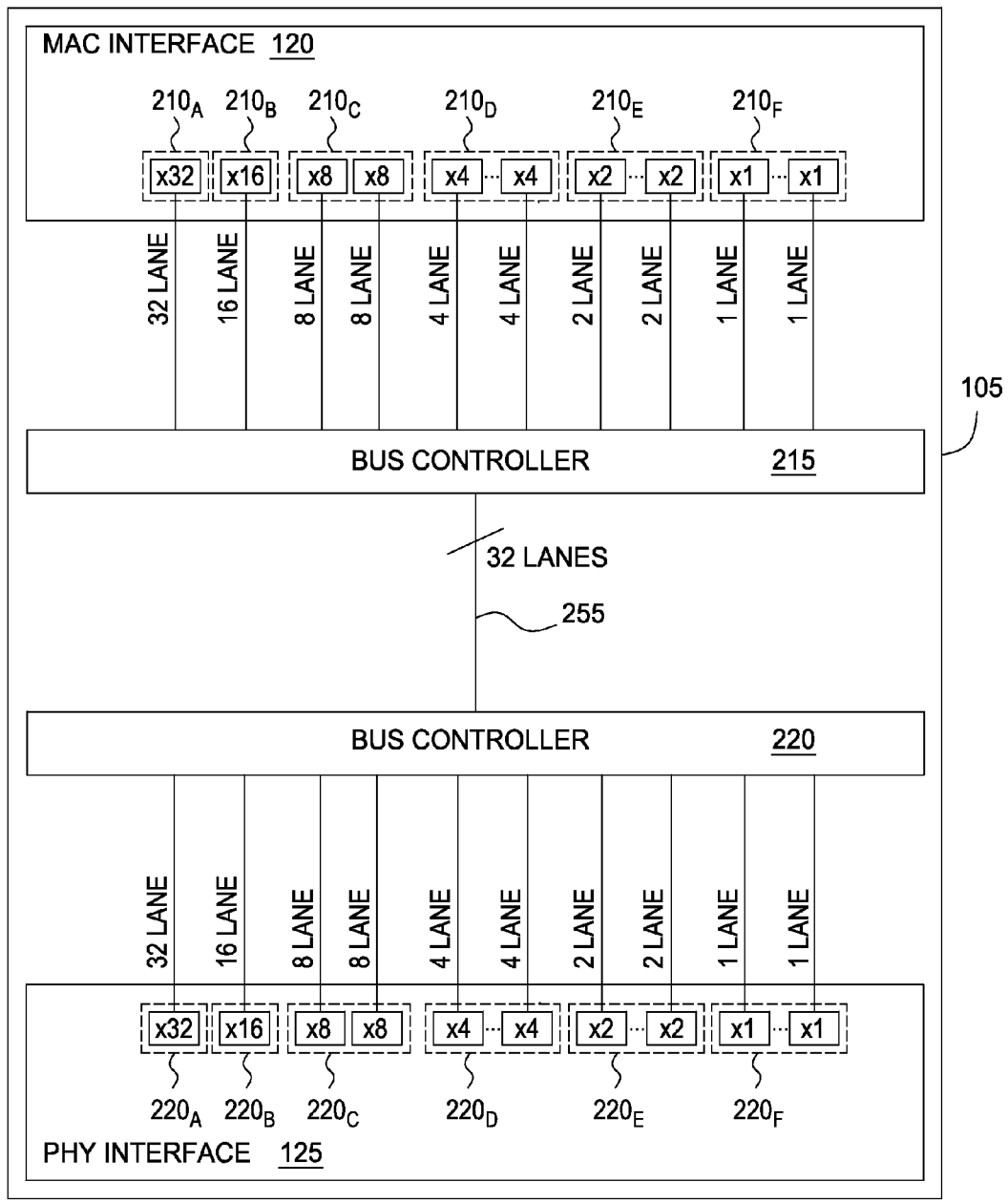
FIG. 2 illustrates an internal bus compatible with a plurality of lane configurations, according to an embodiment disclosed herein.

FIG. 2 illustrates an internal bus compatible with a plurality of lane configurations, according to an embodiment disclosed herein. Specifically, FIG. 2 illustrates a more detailed view of the MAC interfaces 120 and PHY interface 125 of device 105 as shown in FIG. 1. As discussed previously, the MAC and PHY interfaces 120, 125 may transfer data in parallel rather than serially. Thus, the lanes shown here may not include the two differential signal pairs of a PCIe bus such as bus 155 in FIG. 1. Instead, the lanes of the internal bus 255 may include more additional traces for transmitting data in parallel. The MAC and PHY interfaces 120, 125 each include a plurality of hardware modules 210, 220 that are configured to transmit data across the internal bus 255 using different lane configurations. As shown, hardware modules 210A and 220A provide a lane configuration at the PIE-8 interface that includes a single PCIe link that is 32 lanes wide (i.e., 1×32) while hardware modules 210B-F and 220B-F support 1×16, 2×8, 4×4, 8×2 and 16×1 lane configurations, respectively. Note that if the device 105 wants to use a 2×16 lane configuration, hardware modules 210A and 210B may be used in combination to generate two PCIe links that are each 16 lanes wide. That is, hardware module 210A only uses half on the available lanes while all the lanes of module 210B are used. Similarly, if a 4×8 lane configuration is desired, hardware module 210C provides 2 PCIe links that are each 8 lanes wide, hardware module 210B provides a third PCIe link that is 8 lanes wide (i.e., the other 8 lanes are unused), and hardware module 210A provides a fourth PCIe link that is only 8 lanes wide (i.e., the other 24 lanes are unused). A similar process of combining hardware modules may be followed to generate 8×4, 16×2, and 32×1 lane configurations. In other embodiments, however, the PHY and MAC interfaces may include hardware modules that support the desired lane configurations without using hardware modules that support wider PCIe links—e.g., hardware module 210B may include circuitry for providing two, rather than only one, ×16 links.

Generally, hardware modules 210A and 220A may be preferred when a single application needs the maximum amount of bandwidth available—i.e., a PCIe link with the largest available width. However, if multiple applications need to transmit data, the MAC and PHY interfaces 120, 125 may instead use hardware modules 210F and 220F which permit up to 16 individual PCIe links that are each one lane wide. Alternatively, if only one application is using the PCI interface and that application needs only one lane in order to efficiently transmit data across the bus, the PHY interfaces may use hardware module 210F and 220F where only one of the PCIe links is used and the others are inactive. This may conserve power relative to using a PCIe link in other hardware modules that use multiple lanes in each PCIe link to transmit data. The present lane configurations shown in each hardware module 210, 220 are for illustratively purposes only. Any configuration is possible so long as the bus 255 contains sufficient lanes (and traces) to satisfy the desired number of PCIe links and lane widths.

The hardware modules 210, 220 are individually coupled to the bus controllers 215, 220. Although these connections are also shown as lanes, the connections between the modules 210, 220 and the bus controllers 215, 220 and the bus 255 between the bus controllers 215 and 220 may include more or less traces than the lanes of the bus 155 in FIG. 1. For example, in one embodiment, each lane shown in FIG. 2 may include up to 96 signals (i.e., 96 traces creating one lane of the internal bus). The MAC and PHY interfaces 120, 125 each may transmit data to respective bus controllers 215, 220 that determine which hardware modules 210, 220 gain access to the internal bus 255. In one embodiment, the device 105 may be configured to use only a maximum of 32 lanes at a time. That is, the lane configuration cannot exceed a total of 32 lanes. In this manner, the lanes of the bus 255 are shared between the different hardware modules 210, 220. For example, configuration logic may be transmitted to the bus controllers 215, 220 to determine which corresponding hardware modules 210, 220 are permitted access to the bus. In one embodiment, the data received by the MAC and PHY interfaces 120, 125 is transmitted to all of the hardware modules 210, 220; however, the bus controllers 215, 220 permit only 32 lanes of the 112 total lanes connecting to the controllers 215, 220 to transmit data and receive data from the bus 255. As mentioned previously, the bus controllers 215, 220 may permit any combination of the lanes from the different hardware modules 210, 220 to access the bus 255—e.g., 8 lanes from hardware module 220A, 8 lanes from hardware module 220B, and 16 lanes from hardware module 220C to form a 4×8 lane configuration. Of course, the devices may change the configuration logic to instruct the bus controllers 215, 220 to permit different lanes to access to the bus 255, thereby changing the lane configuration used to transmit data.

In embodiments where the bus controllers 215, 220 are not used in the device 105, each hardware module 210 in the MAC interface 120 may be coupled to a corresponding hardware module 220 in PHY interface 125 via a dedicated bus (i.e., a sub-bus). For example hardware module 210A may be connected to hardware module 220A using a 32 lane sub-bus, hardware module 210B may be connected to hardware module 220B via a 16 lane sub-bus, and so forth. This configuration results in an internal bus that is 112 lanes wide. Instead of using only a single bus whose lanes are shared by the hardware modules as shown in FIG. 2, each lane configuration established by the hardware modules adds to the size of the total bus (i.e., the combination of all the different sub-buses) connecting the MAC and PHY interfaces 120, 125. Moreover, the MAC and PHY interfaces 120, 125 may be configured to use only one of these lane configurations at a time. Thus, at most, only 32 lanes of these sub-buses are transferring data at any given time. Using the configuration shown in FIG. 2, if each lane includes 96 traces, using dedicated sub-buses instead of a shared bus 255 adds an additional 80 lanes and up to 7680 traces (80×96) along the interconnect coupling the MAC and PHY interfaces 120, 125. Accordingly, using the bus controller to share the lanes of the bus between multiple lane configurations may reduce wire congestion relative to connecting each hardware module to a corresponding hardware module using a plurality of dedicated sub-buses.

In one embodiment, the hardware modules used in the MAC interface 120 are the same as the hardware modules used in the PHY interface 125. Stated differently, the device 105 transmits data using the same lane configuration regardless of whether data is transferred from the MAC interface 120 to the PHY interface 125 or from the PHY interface 125 to the MAC interface 120. In one embodiment, however, not every PCIe link established by the hardware modules 210, 220 may be used to transmit data between the MAC and PHY interfaces 120, 125. For example, the bus controllers 215 and 220 may couple hardware modules 210D and 220D to the shared bus 255 but only two of the four PCIe links may used while the other two links (8 lanes) are inactive.

Although not shown, the hardware modules 220 in the PHY interface 125 may be connected to a SerDes which then couples to the PCIe bus 155 shown in FIG. 1. Moreover, device 130 may have its respective PHY and MAC interfaces 140, 145 connected as shown in FIG. 2—i.e., with bus controllers coupled to a shared internal bus.

Figure 3:
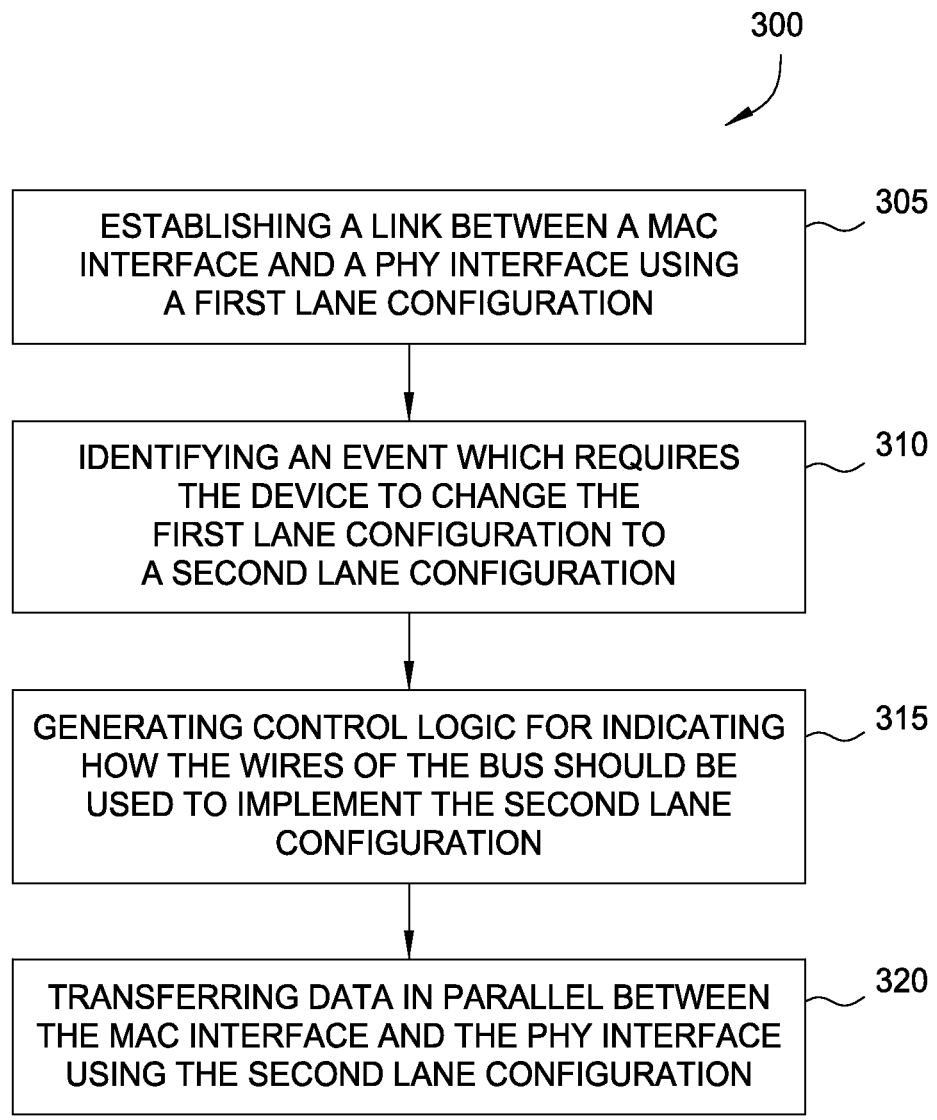
FIG. 3 illustrates a method of sharing the same lanes in the internal bus, according to an embodiment disclosed herein.

FIG. 3 illustrates a method of sharing the same lanes in a shared PCI bus, according to an embodiment disclosed herein. Method 300 begins at step 305 where at least one PCIe connection is established between MAC and PHY interfaces in a PCIe enabled devices—i.e., a device with a PCIe interface. This PCIe connection may be part of a PCIe link establish between two PCIe enabled devices. In general, the connection between the MAC and PHY interfaces may support any number of PCIe links and any number of lanes in each link so long as the physical bus electrically coupling the interfaces includes sufficient wires (or traces) for accommodating the total number of lanes used in the PCIe connection.

In one embodiment, at step 305, the device may enter into a negotiation process with the other PCIe device for determining which lane configuration to use as a first lane configuration. During this process, the PCIe enabled devices determine the capabilities of the other device (i.e., the different number of lane configurations the respective PHY interfaces support) and choose, for example, the lane configuration that has the widest PCIe link supported by both devices. For example, if one device includes hardware modules that supports up to a 2×16 lane configuration but the other device at most supports a 4×8 lane configuration, the devices may decide to both use the 4×8 lane configuration to transfer data. Once the devices have established the lane configuration, the devices may individually configure the MAC and PHY interfaces—i.e., connect the appropriate hardware modules using bus controllers—to provide a PCIe connection based on the lane configuration negotiated by the two devices. Thus, in one embodiment, the lane configuration established in the PIE-8 interface between the MAC interface and PHY interface is similar to the lane configuration in the PCIe bus that connects the two devices except that data is transferred in parallel rather than serially.

At step 310, one or both of the PCI enabled devices identifies an event or receives an event message which causes at least one of the PCIe enabled devices to change its lane configuration. For example, an application may send a command to a device to increase the lane width of its associated PCIe link. Referring to FIG. 2, if an application is currently using one of the ×4 links of hardware module 210D, the application could transmit data faster if the application is permitted to use one of the ×8 links in hardware module 210C instead. Another example of an event message is a buffer overflow signal that may indicate packets are being dropped or a buffer is near maximum capacity which may indicate that the current lane configuration is inadequate. Further, an event may be detecting a change in a power saving mode that instructs the devices to use PCIe links with smaller widths in order to conserve power. For example, the power saving mode may change based on the utilization of buffers associated with the PHY interface and/or hardware modules.

At step 315, the PHY interfaces may generate control signals based on the event or event message. The control signals may designate a particular lane configuration to be used for transmitting data across the PCIe bus and the internal bus coupling the MAC and PHY interfaces. In one embodiment, a bus controller connected to the internal bus receives the control signals and permits the hardware module corresponding to the designated lane configuration to access the bus. Alternatively, the control signal may activate a subset of the hardware modules used for the designated lane configuration while the other hardware modules are deactivated—e.g., powered down—such that only selected hardware module transmits data to the bus controller.

In one embodiment, the control signals are shared to renegotiate a different configuration between the two devices. For example, if one of the devices identifies an event which requires changing the lane configuration, the device may use the current lane configuration to transmit these control signals to the other device. Transmitting control signals between the devices may cause the devices to renegotiate a different lane configuration that satisfies the criteria associated with the event—i.e., increasing available bandwidth in a link, conserving power, preventing dropped packets, and the like. At step 320, the device (or devices) may transmit data to or receive data from the other device using the second different lane configuration.

Figure 4A:
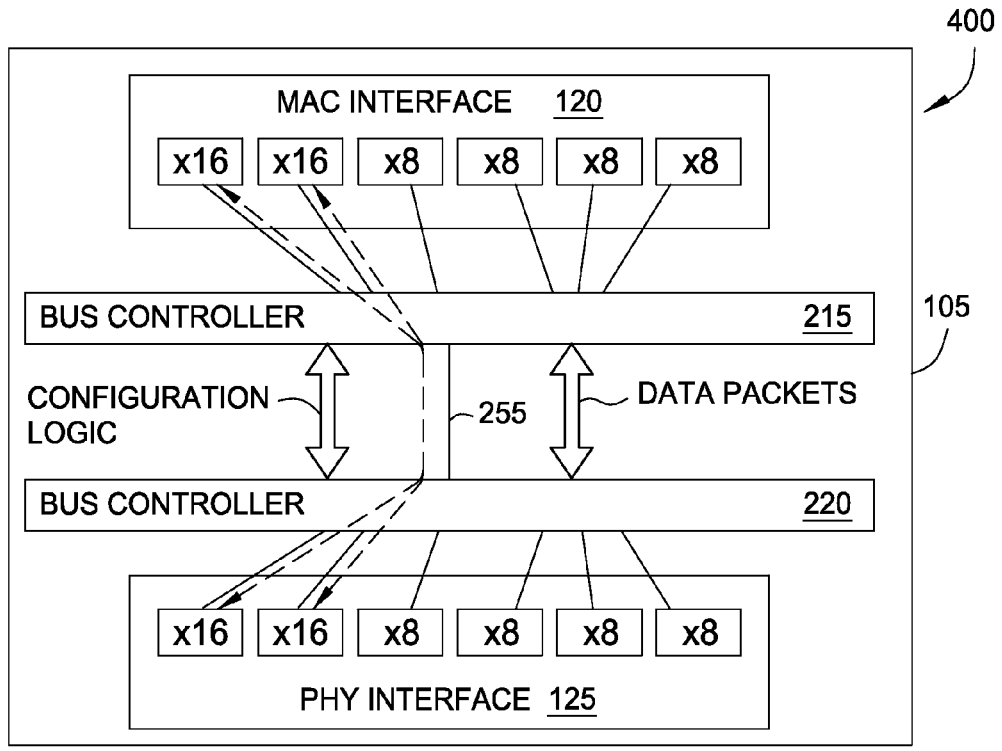
FIGS. 4A-4B illustrate lane splitting using the internal bus, according to embodiments disclosed herein.
Figure 4B:
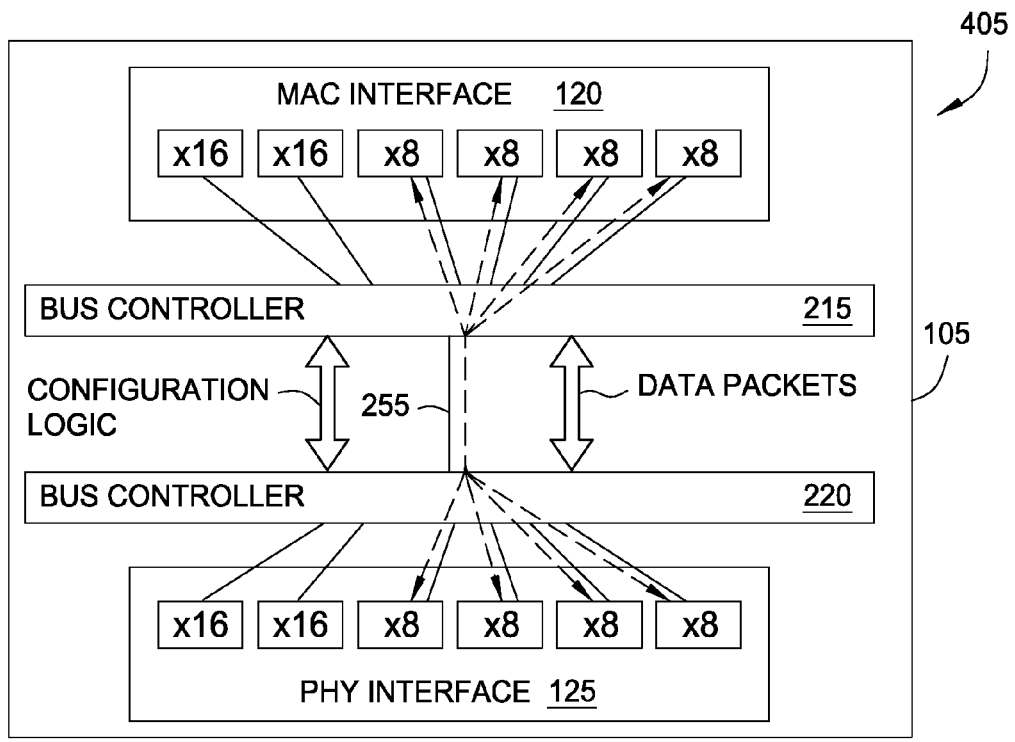

FIGS. 4A-4B illustrates lane splitting using an internal bus, according to embodiments disclosed herein. As shown in FIG. 4A, the system 400 is configured such that bus controller 215 and 220 transfer data between MAC and PHY interfaces 120, 125 using a 2×16 lane configuration as indicated by the dotted lines. In addition to transmitting data packets (i.e., packets generated by applications executing on the devices), the PCIe links may transmit configuration logic using other PCIe packets. Moreover, the configuration logic may be transmitted using additional dedicated lanes or traces in the bus 255. The configuration logic may be used to communicate and configure the PCIe interfaces (not shown in FIGS. 4A-4B) on two connected devices. For example, when device 150 wants to change the lane configuration used to transmit data, the device 150 transmits configuration logic from the MAC interface 120 to the PHY interface 125 which then routes the logic onto a PCIe bus that connects the originating device to another PCIe enabled device. Although not shown, the configuration logic may also be passed by the bus controllers 215, 220 to other logic modules in device 105.

FIG. 4B illustrates lane splitting such that the lanes of the bus are reallocated to form additional PCIe links. Specifically, the system 405 shows the lane configuration of the bus 255 is changed from 2×16 to 4×8. That is, the PCIe links shown in system 400 were further divided in system 405 to yield four PCIe links, each with a width of 8 lanes (as shown by the dotted lines). Lane splitting permits a system to, for example, conserve power or create additional PCIe links that may be dedicated to additional applications. Alternatively and additionally, the system 405 may perform lane fusing where the configuration logic instructs both bus controllers 215, 220 to use one or more hardware modules to implement a lane configuration with wider PCIe links. In this case, the configuration logic may change system 405 such that the lane configuration returns to the configuration shown in system 400 (i.e., 2×16).

Figure 5A:
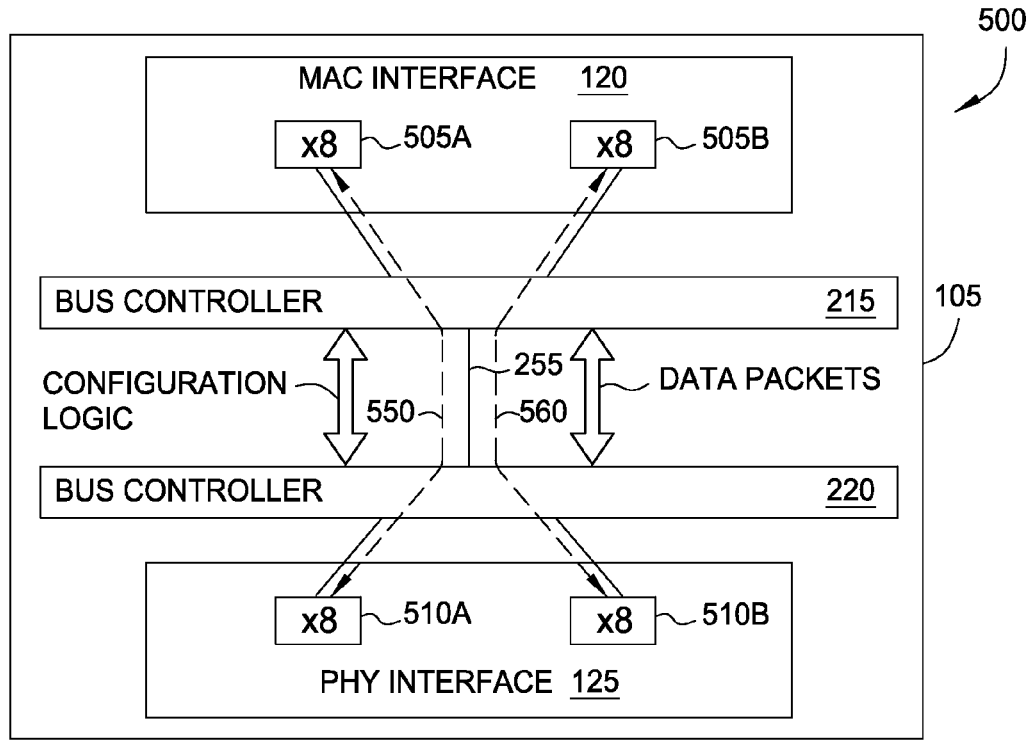
FIGS. 5A-5B illustrate lane swapping using the internal bus, according to embodiments disclosed herein.
Figure 5B:
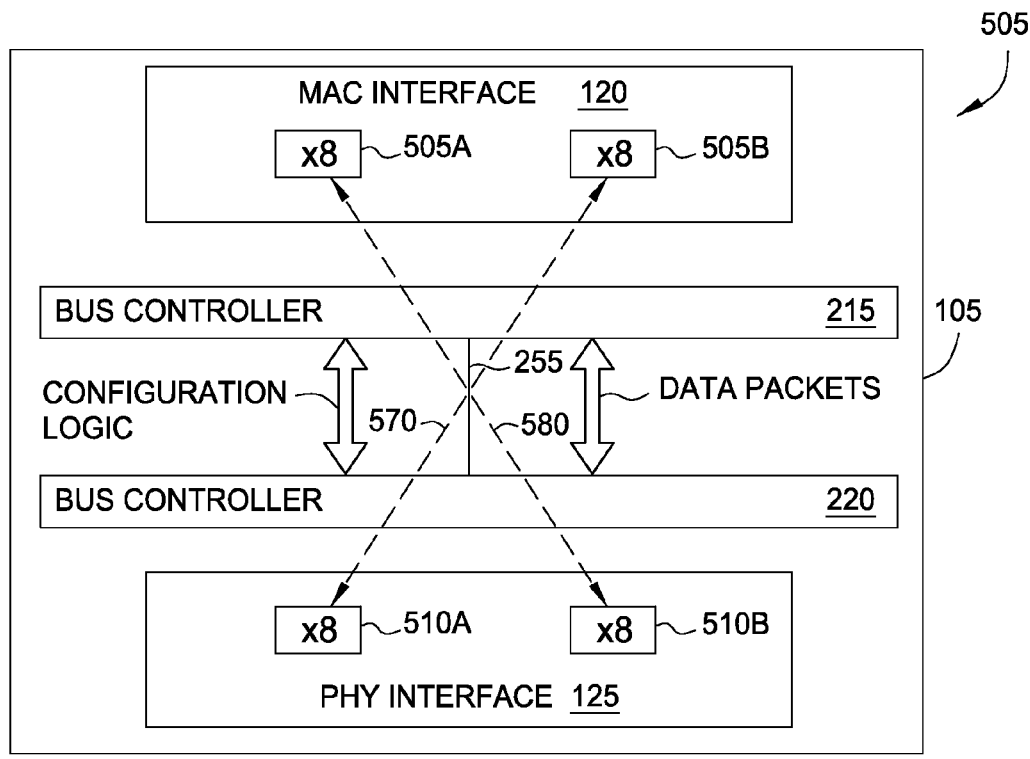

FIGS. 5A-5B illustrates lane swapping (also referred to as lane reversal) using an internal bus, according to embodiments disclosed herein. As shown in FIG. 5A, the system 500 is configured to transmit data using a 2×8 lane configuration. Moreover, dotted line 550 represents that the data transmitted by hardware sub-module 505A is received by hardware sub-module 510A and vice versa. Dotted line 560 illustrates a similar relationship for hardware sub-modules 505B and 510B. However, in some embodiments, it may be desirable for the reconfigure how the sub-modules 505, 510 are interconnected within the same lane configuration. That is, to perform lane swapping, the lane configuration remains unchanged.

FIG. 5B illustrates the result of lane swapping where sub-module 505A now sends data to and receives data from sub-module 510B, and sub-module 505B now sends data to and receives data from sub-module 510A. To accomplish this swap while maintaining the same lane configuration (i.e., 2×8), the configuration logic may instruct the bus controller 215 and 220 to reroute the data received on the shared bus 155. Because the bus controllers 215, 220 receive and route the data to the appropriate hardware modules and sub-modules 505, 510, the controllers 215, 220 can easily change how the received data is routed into the sub-modules 505, 510 in the MAC and PHY interfaces 120, 125. In this manner, the bus controllers 215, 220 function much like switching elements where data received at one interface (i.e., the connection to the shared bus) is routed to any one of a plurality of interfaces (i.e., the plurality of connections shown in FIG. 2 to the hardware modules and sub-modules). In contrast, a system where the sub-modules 505 and 510 are directly connected by dedicated lanes may be incapable of performing lane swapping at the interface between the MAC and PHY interfaces 120, 125. Instead, these systems need a separate routing layer between the MAC interface 120 and the processing element (not shown) for swapping data received on one sub-module with data received on a different sub-module. This configuration may cause further wire congestion by requiring wires that connect the different sub-modules.

Figure 6A:
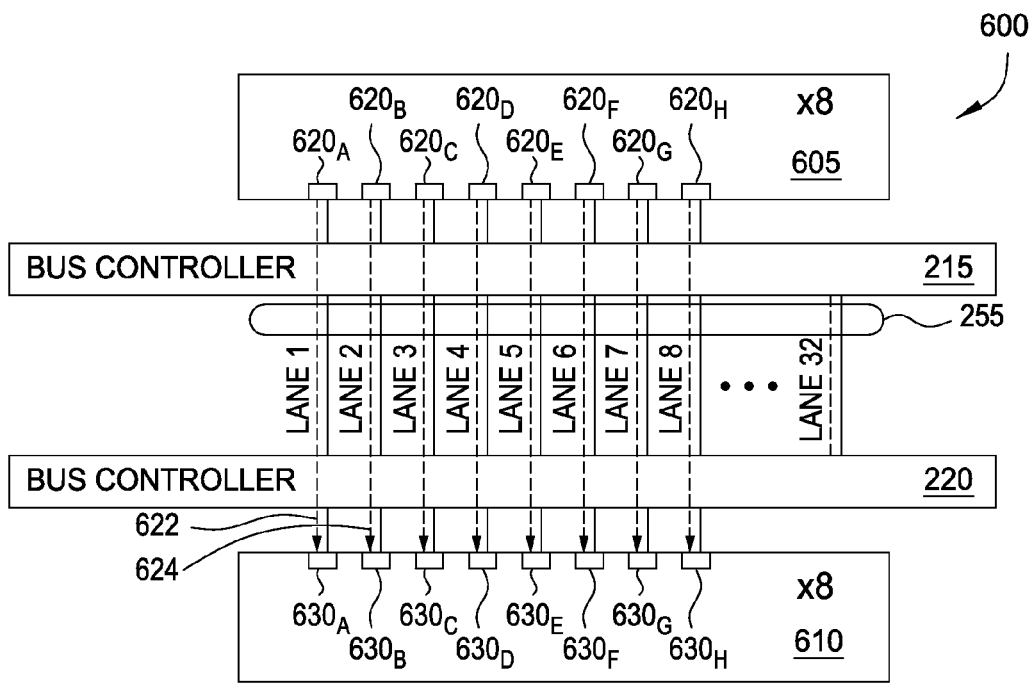
FIGS. 6A-6B illustrate lane reversal using the internal bus, according to embodiments disclosed herein.
Figure 6B:
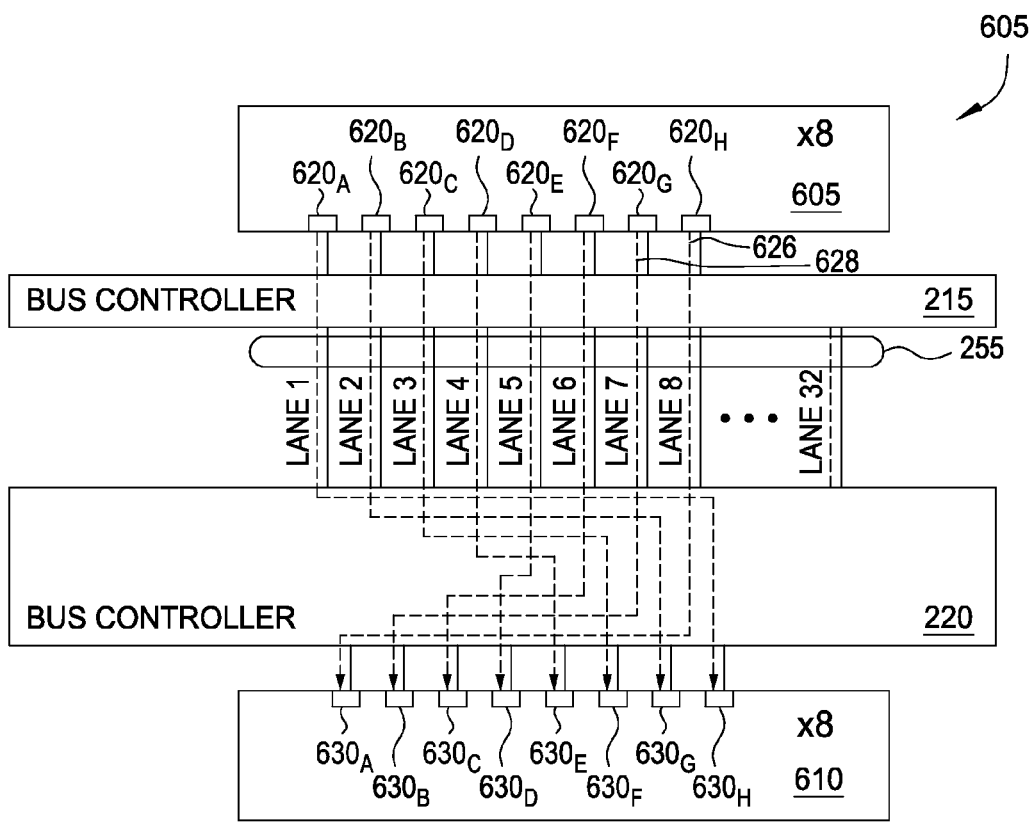

FIGS. 6A-6B illustrates port swapping using a PCI bus, according to embodiments disclosed herein. As shown in FIG. 6A, bus 255 may have 32 lanes of which lanes 1-8 may be used to transfer data between sub-module 605 and sub-module 610. Specifically, the bus controllers 215, 220 may be configured such that the sub-module 610 receives data from lane 1 at a first port 630A as shown by dotted line 622, data from lane 2 on the second port 630B as shown by dotted line 624, and so forth. As used herein, the ports 620 and 630 may be any connection interface between the sub-modules 605 and 610 and the bus controllers 215, 220. Moreover, multiple traces or wires may used to connect each port 620, 630 to the bus controllers 215, 220 thereby allowing more than one bit to be transmitted between the circuit elements in parallel per clock cycle.

As shown by FIG. 6B, the bus controller 220 may perform port swapping where the data received on lane 8 is transmitted to the first port 630A as shown by dotted line 626, the data received on lane 7 is transmitted to the second port 630B as shown by dotted line 628, and so forth. Although the lane-to-port assignments are reversed in the order shown in FIG. 6B, one of ordinary skill in the art will recognize that the bus controllers 215, 220 may be configured to assign any lane of the PCIe link to any port of the sub-module by using the switch-like properties of the bus controllers 215, 220. In contrast, in a system where each sub-module is directly coupled to a corresponding sub-module via a dedicated bus, lane reversal cannot be performed at the interface between the MAC and PHY interfaces 120, 125. These systems may require additional routing logic in order to perform port swapping.

EXAMPLE SYSTEM

Figure 7:
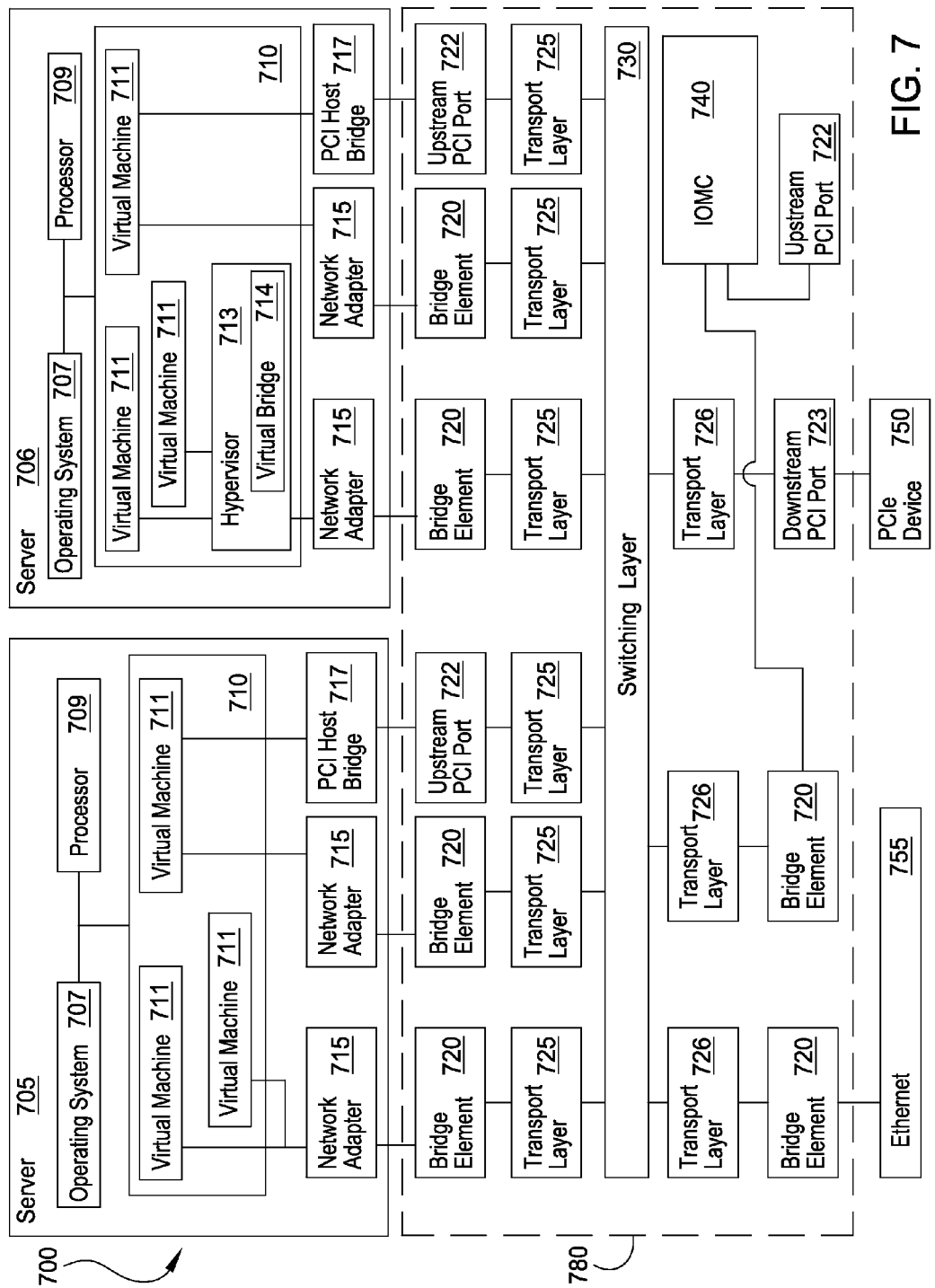
FIG. 7 illustrates a system architecture that includes a distributed, virtual switch, according to one embodiment described herein.

FIG. 7 illustrates a system architecture that includes a distributed virtual switch, according to one embodiment described herein. The first server 705 may include at least one processor 709 coupled to a memory 710. The processor 709 may represent one or more processors (e.g., microprocessors) or multi-core processors. The memory 910 may represent random access memory (RAM) devices comprising the main storage of the server 705, as well as supplemental levels of memory, e.g., cache memories, non-volatile or backup memories (e.g., programmable or flash memories), read-only memories, and the like. In addition, the memory 710 may be considered to include memory storage physically located in the server 105 or on another computing device coupled to the server 705.

The server 705 may operate under the control of an operating system 707 and may execute various computer software applications, components, programs, objects, modules, and data structures, such as virtual machines 711.

The server 705 may include network adapters 715 (e.g., converged network adapters). A converged network adapter may include single root I/O virtualization (SR-IOV) adapters such as a PCIe adapter that supports Converged Enhanced Ethernet (CEE). Another embodiment of the system 700 may include a multi-root I/O virtualization (MR-IOV) adapter. The network adapters 715 may further be used to implement of Fiber Channel over Ethernet (FCoE) protocol, RDMA over Ethernet, Internet small computer system interface (iSCSI), and the like. In general, a network adapter 715 transfers data using an Ethernet or PCI based communication method and may be coupled to one or more of the virtual machines 711. Additionally, the adapters may facilitate shared access between the virtual machines 711. While the adapters 715 are shown as being included within the server 705, in other embodiments, the adapters may be physically distinct devices that are separate from the server 705.

In one embodiment, each network adapter 715 may include a converged adapter virtual bridge (not shown) that facilitates data transfer between the adapters 715 by coordinating access to the virtual machines 711. Each converged adapter virtual bridge may recognize data flowing within its domain (i.e., addressable space). A recognized domain address may be routed directly without transmitting the data outside of the domain of the particular converged adapter virtual bridge.

Each network adapter 715 may include one or more Ethernet ports that couple to one of the bridge elements 720. Additionally, to facilitate PCIe communication, the server may have a PCI Host Bridge 717. The PCI Host Bridge 717 would then connect to an upstream PCIe port 722 on a switch element in the distributed switch 780. In one embodiment, the PCIe Host Bridge 717 of server 705 may contain PCIe interface 115 shown in FIG. 1 which may include the MAC and PHY interfaces 120, 125 connected as shown in FIG. 2, thereby minimizing the wire congestion in the PCIe Host Bridge 717 as well as enabling features in the PCIe interface such as lane splitting, lane reversal, port swapping, and the like. After the data is received and processed by the upstream PCIe port 722, the data is then routed via the switching layer 730 to the correct downstream PCIe port 723 which may be located on the same or different switch module as the upstream PCIe port 722. The data may then be forwarded to the PCIe device 750. Further, the MAC and PHY interfaces 120, 125 configuration shown in FIG. 2 may also be used in the computing device containing the PCIe device 750. That is, the PCIe device 750 may include MAC and PHY interfaces that are coupled to a shared bus via bus controllers, thereby minimizing wire congestion in the PCIe bus and providing the advantages discussed above.

The bridge elements 720 may be configured to forward data frames throughout the distributed virtual switch 780. For example, a network adapter 715 and bridge element 720 may be connected using two 40 Gbit Ethernet connections or one 100 Gbit Ethernet connection. The bridge elements 720 forward the data frames received by the network adapter 715 to the switching layer 730. The bridge elements 720 may include a lookup table that stores address data used to forward the received data frames. For example, the bridge elements 720 may compare address data associated with a received data frame to the address data stored within the lookup table. Thus, the network adapters 715 do not need to know the network topology of the distributed switch 780.

The distributed virtual switch 780, in general, includes a plurality of bridge elements 720 that may be located on a plurality of a separate, though interconnected, hardware components. To the perspective of the network adapters 715, the switch 780 acts like one single switch even though the switch 780 may be composed of multiple switches that are physically located on different components. Distributing the switch 780 provides redundancy in case of failure.

Each of the bridge elements 720 may be connected to one or more transport layer modules 725 that translate received data frames to the protocol used by the switching layer 730. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 730.

Although not shown in FIG. 7, in one embodiment, the switching layer 730 may comprise a local rack interconnect with dedicated connections which connect bridge elements 720 located within the same chassis and rack, as well as links for connecting to bridge elements 720 in other chassis and racks.

After routing the cells, the switching layer 730 may communicate with transport layer modules 726 that translate the cells back to data frames that correspond to their respective communication protocols. A portion of the bridge elements 720 may facilitate communication with an Ethernet network 755 which provides access to a LAN or WAN (e.g., the Internet). Moreover, PCI data may be routed to a downstream PCI port 723 that connects to a PCIe device 750. The PCIe device 750 may be a passive backplane interconnect, as an expansion card interface for add-in boards, or common storage that can be accessed by any of the servers connected to the switch 780.

Although "upstream" and "downstream" are used to describe the PCI ports, this is only used to illustrate one possible data flow. For example, the downstream PCI port 723 may in one embodiment transmit data from the connected to the PCIe device 750 to the upstream PCI port 722. Thus, the PCI ports 722, 723 may both transmit as well as receive data.

A second server 706 may include a processor 709 connected to an operating system 707 and memory 710 which includes one or more virtual machines 711 similar to those found in the first server 705. The memory 710 of server 706 also includes a hypervisor 713 with a virtual bridge 714. The hypervisor 713 manages data shared between different virtual machines 711. Specifically, the virtual bridge 714 allows direct communication between connected virtual machines 711 rather than requiring the virtual machines 711 to use the bridge elements 720 or switching layer 730 to transmit data to other virtual machines 711 communicatively coupled to the hypervisor 713.

An Input/Output Management Controller (IOMC) 740 (i.e., a special-purpose processor) is coupled to at least one bridge element 720 or upstream PCI port 722 which provides the IOMC 740 with access to the switching layer 730. One function of the IOMC 740 may be to receive commands from an administrator to configure the different hardware elements of the distributed virtual switch 780. In one embodiment, these commands may be received from a separate switching network from the switching layer 730.

Although one IOMC 740 is shown, the system 700 may include a plurality of IOMCs 740. In one embodiment, these IOMCs 740 may be arranged in a hierarchy such that one IOMC 740 is chosen as a master while the others are delegated as members (or slaves).

Figure 8:
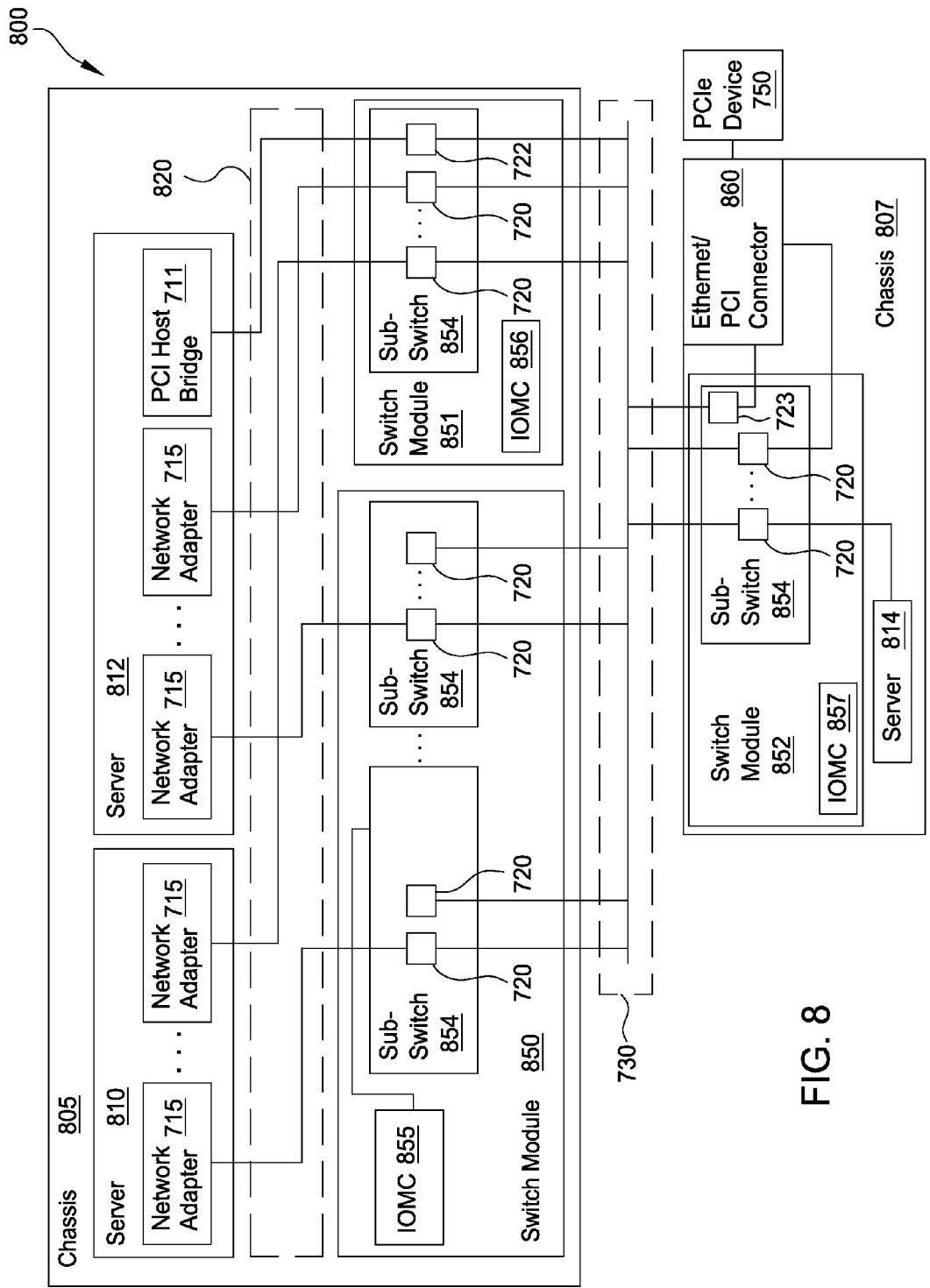
FIG. 8 illustrates the hardware representation of a system that implements a distributed, virtual switch, according to one embodiment described herein.

FIG. 8 illustrates a hardware level diagram of the system 700, according to one embodiment. Server 810 and 812 may be physically located in the same chassis 805; however, the chassis 805 may include any number of servers. The chassis 805 also includes a plurality of switch modules 850, 851 that include one or more sub-switches 854 (i.e., a microchip). In one embodiment, the switch modules 850, 851, 852 are hardware components (e.g., PCB boards, FPGA boards, etc.) that provide physical support and connectivity between the network adapters 815 and the bridge elements 820. In general, the switch modules 850, 851, 852 include hardware that connects different chassis 805, 807 and servers 810, 812, 814 in the system 800 and may be a single, replaceable part in the computing system.

The switch modules 850, 851, 852 (e.g., a chassis interconnect element) include one or more sub-switches 854 and an IOMC 855, 856, 857. The sub-switches 854 may include a logical or physical grouping of bridge elements 720—e.g., each sub-switch 854 may have five bridge elements 720. Each bridge element 720 may be physically connected to the servers 810, 812. For example, a bridge element 720 may route data sent using either Ethernet or PCI communication protocols to other bridge elements 720 attached to the switching layer 730 using the routing layer. However, in one embodiment, the bridge element 720 may not be needed to provide connectivity from the network adapter 715 to the switching layer 730 for PCI or PCIe communications.

Each switch module 850, 851, 852 includes an IOMC 855, 856, 857 for managing and configuring the different hardware resources in the system 800. In one embodiment, the respective IOMC for each switch module 850, 851, 852 may be responsible for configuring the hardware resources on the particular switch module. However, because the switch modules are interconnected using the switching layer 730, an IOMC on one switch module may manage hardware resources on a different switch module. As discussed above, the IOMCs 855, 856, 857 are attached to at least one sub-switch 854 (or bridge element 720) in each switch module

850, 851, 852 which enables each IOMC to route commands on the switching layer 730. For clarity, these connections for IOMCs 856 and 857 have been omitted. Moreover, switch modules 851, 852 may include multiple sub-switches 854.

The dotted line in chassis 805 defines the midplane 820 between the servers 810, 812 and the switch modules 850, 851. That is, the midplane 820 includes the data paths (e.g., conductive wires or traces) that transmit data between the network adapters 715 and the sub-switches 854.

Each bridge element 820 and upstream PCI port 722 connects to the switching layer 730 via the routing layer. In addition, a bridge element 720 may also connect to a network adapter 715 or an uplink. As used herein, an uplink port of a bridge element 720 provides a service that expands the connectivity or capabilities of the system 800. As shown in chassis 807, one bridge element 720 includes a connection to an Ethernet or PCI connector 860. For Ethernet communication, the connector 860 may provide the system 800 with access to a LAN or WAN (not shown). Alternatively, the port connector 860 may connect the system to a PCIe expansion slot—e.g., PCIe device 750. The device 750 may be additional storage or memory which each server 810, 812, 814 may access via the switching layer 730. Advantageously, the system 800 provides access to a switching layer 730 that has network devices that are compatible with at least two different communication methods.

As shown, a server 810, 812, 814 may have a plurality of network adapters 715. This provides redundancy if one of these adapters 715 fails. Additionally, each adapter 715 may be attached via the midplane 820 to a different switch module 850, 851, 852. As illustrated, one adapter of server 810 is communicatively coupled to a bridge element 720 located in switch module 850 while the other adapter is connected to a bridge element 720 in switch module 851. If one of the switch modules 850, 851 fails, the server 810 is still able to access the switching layer 730 via the other switching module. The failed switch module may then be replaced (e.g., hot-swapped) which causes the IOMCs 855, 856, 857 and bridge elements 720 to update the routing tables and lookup tables to include the hardware elements on the new switching module.

Figure 9:
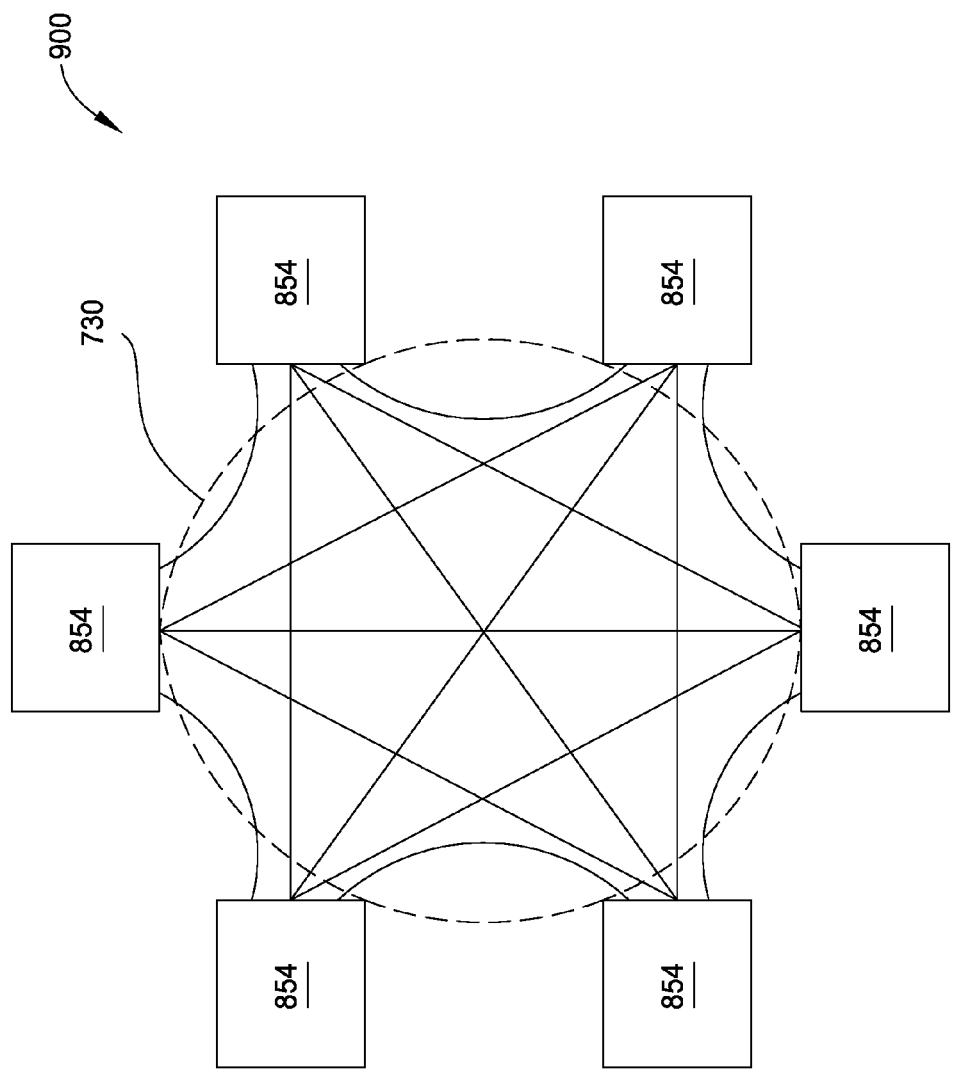
FIG. 9 illustrates a distributed, virtual switch, according to one embodiment described herein.

FIG. 9 illustrates a virtual switching layer, according to one embodiment described herein. Each sub-switch 854 in the systems 700 and 800 are connected to each other using the switching layer 730 via a mesh connection schema. That is, no matter the sub-switch 854 used, a cell (i.e., data packet) can be routed to another other sub-switch 854 located on any other switch module 850, 851, 852. This may be accomplished by directly connecting each of the bridge elements 720 of the sub-switches 854—i.e., each bridge element 720 has a dedicated data path to every other bridge element 720. Alternatively, the switching layer 730 may use a spine-leaf architecture where each sub-switch 854 (i.e., a leaf node) is attached to at least one spine node. The spine nodes route cells received from the sub-switch 854 to the correct spine node which then forwards the data to the correct sub-switch 854. However, this invention is not limited to any particular technique for interconnecting the sub-switches 854.

Conclusion

Each PCIe device may include MAC and PHY interfaces that support a plurality of different lane configurations. For example, these interfaces may include hardware modules that support 1×32, 2×16, 4×8, 8×4, 16×2, and 32×1 parallel communication between the interfaces. Instead of physically connecting each of the hardware modules in the MAC interface to respective hardware modules in the PHY interface using dedicated traces, the device may include two bus controllers that arbitrate which hardware modules in the respective interfaces are connected to the internal bus between the interfaces. When a different lane configuration is desired, the bus controller couples the corresponding hardware module to the internal bus. In this manner, the different lane configurations share the same lanes (and wires) of the bus as the other lane configurations. Accordingly, the shared bus only needs to include enough lanes (and wires) necessary to accommodate the widest possible lane configuration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing device, comprising:
a first interface comprising hardware modules configured to support at least a first lane configuration and a second lane configuration for transmitting data in a PCI type connection;
a second interface comprising hardware modules configured to support at least the first lane configuration and the second lane configuration;
a bus comprising a plurality of lanes for transmitting data between the first and second interfaces; and
at least two bus controllers configured to selectively provide access between the hardware modules of the first and second interfaces and the bus, wherein the hardware modules of the first and second interfaces use at least one of the plurality of lanes when transmitting data in the first lane configuration that is also used when transmitting data in the second lane configuration,
wherein the first and second lane configurations are allocated at least one lane of the bus to create at least one PCI type link, and
wherein the hardware modules of the first and second interfaces are coupled to the at least two bus controllers by interconnects that are not shared by any other hardware modules in the first and second interfaces.

2. The computing device of claim 1, wherein each of the plurality of lanes comprises a plurality of traces, wherein the first and second lane configurations are allocated a same number of lanes for use in the bus.

3. The computing device of claim 2, wherein the first and second lane configurations use at least one shared trace of the plurality of traces for transferring data on the bus.

4. The computing device of claim 1, wherein the at least one PCI type link is a PCI Express link with at least one of: a ×32, ×16, ×8, ×4, ×2, and ×1 lane width.

5. The computing device of claim 1, wherein the first interface is a MAC interface and the second interface is a PHY interface.

6. A system, comprising:
an external bus for serial communication;
a first computing device, comprising:
  a first interface comprising hardware modules configured to support at least a first lane configuration and a second lane configuration for transmitting data in a PCI type connection;
  a second interface comprising hardware modules configured to support at least the first lane configuration and the second lane configuration;
  an internal bus comprising a plurality of lanes for transmitting data in parallel between the first and second interfaces; and
  at least two bus controllers configured to selectively provide access between the hardware modules of the first and second interfaces and the internal bus, wherein the hardware modules of the first and second interfaces use at least one of the plurality of lanes when transmitting data in the first lane configuration that is also used when transmitting data in the second lane configuration,
  wherein the hardware modules of the first and second interfaces are coupled to the at least two bus controllers by interconnects that are not shared by any other hardware modules in the first and second interfaces, and
  wherein the first and second lane configurations are allocated at least one lane of the internal bus to create at least one PCI type link that transmits data packets in parallel rather than serially; and
a second computing device, wherein the external bus couples to both the first and second computing devices and transfers data serially between the first and second computing devices.

7. The system of claim 6, wherein the first computing device further comprises a serializer/deserializer configured to receive data from the internal bus, serialize the received data, and provide the serialized data to the external bus.

8. The system of claim 6, wherein the first interface is a MAC interface and the second interface is a PHY interface.

9. 6The system of claim 6, wherein each of the plurality of lanes comprises a plurality of traces.

10. The system of claim 9, wherein the first and second lane configurations use at least one shared trace of the plurality of traces for transferring data on the internal bus.

11. The system of claim 6, wherein the at least one PCI type link is a PCI Express link with at least one of: a ×32, ×16, ×8, ×4, ×2, and ×1 lane width.

12. The system of claim 6, wherein the first and second lane configurations are allocated a same number of lanes for use in the internal bus.

* * * * *